United States Patent
Sung et al.

(10) Patent No.: US 9,385,388 B2
(45) Date of Patent: *Jul. 5, 2016

(54) POLYMER ELECTROLYTE MEMBRANE FOR FUEL CELL, MEMBRANE ELECTRODE ASSEMBLY AND FUEL CELL INCLUDING THE SAME

(75) Inventors: Kyung A Sung, Daejeon (KR); Hyuk Kim, Daejeon (KR); Seong Ho Choi, Daejeon (KR); Sang Woo Lee, Daejeon (KR); Tae Geun Noh, Daejeon (KR); Do Young Kim, Daejeon (KR); Min Kyu Min, Incheon (KR)

(73) Assignee: LG CHEM, LTD., Seoul (KR)

( * ) Notice: Subject to any disclaimer, the term of this patent is extended or adjusted under 35 U.S.C. 154(b) by 85 days.

This patent is subject to a terminal disclaimer.

(21) Appl. No.: 14/115,838

(22) PCT Filed: Jun. 5, 2012

(86) PCT No.: PCT/KR2012/004416
§ 371 (c)(1),
(2), (4) Date: Feb. 19, 2014

(87) PCT Pub. No.: WO2012/173352
PCT Pub. Date: Dec. 20, 2012

(65) Prior Publication Data
US 2014/0193741 A1    Jul. 10, 2014

(30) Foreign Application Priority Data
Jun. 16, 2011    (KR) .................. 10-2011-0058603

(51) Int. Cl.
*H01M 8/10* (2006.01)
*D01F 2/00* (2006.01)
(Continued)

(52) U.S. Cl.
CPC .............. *H01M 8/1051* (2013.01); *D01D 5/40* (2013.01); *D01F 2/00* (2013.01); *D01F 2/24* (2013.01);
(Continued)

(58) Field of Classification Search
None
See application file for complete search history.

(56) References Cited

U.S. PATENT DOCUMENTS 5,981,097 A * 11/1999 Rajendran .................. 429/494
6,103,790 A *  8/2000 Cavaille et al. ............. 524/13
(Continued)

FOREIGN PATENT DOCUMENTS

CN    1675792 A    9/2005
EP    1662594 A1   5/2006
(Continued)

OTHER PUBLICATIONS

J-Plat-Pat machine translation of the detailed description of JP 2004-063430A (Feb. 2004).*
(Continued)

*Primary Examiner* — Gregg Cantelmo
(74) *Attorney, Agent, or Firm* — Dentons US LLP

(57) ABSTRACT

Disclosed are a polymer electrolyte membrane for fuel cells and a membrane electrode assembly and fuel cell including the same. The polymer electrolyte membrane includes a fluorine-based cation exchange resin having proton conductivity and fibrous nanoparticles having a hydrophilic group. By using the fluorine-based cation exchange resin having proton conductivity and the fibrous nanoparticles having a hydrophilic group in combination, performance of a fuel cell including the polymer electrolyte membrane is not deteriorated and the polymer electrolyte membrane prevents gases from permeating thereinto and has enhanced durability for extended use. A fuel cell including the above-described polymer electrolyte membrane is provided.

11 Claims, 8 Drawing Sheets

(51) Int. Cl.
  *D01D 5/40* (2006.01)
  *D01F 2/24* (2006.01)
  *D01F 2/28* (2006.01)
(52) U.S. Cl.
  CPC .............. *D01F 2/28* (2013.01); *H01M 8/1023* (2013.01); *H01M 8/1039* (2013.01); *H01M 8/1053* (2013.01); *H01M 8/1058* (2013.01); *H01M 2008/1095* (2013.01); *Y02E 60/521* (2013.01)

(56) References Cited

U.S. PATENT DOCUMENTS

| | | | |
|---|---|---|---|
| 7,183,017 B2 * | 2/2007 | Taft et al. | 429/492 |
| 7,405,015 B2 * | 7/2008 | Xiao et al. | 429/481 |
| 9,005,841 B2 * | 4/2015 | Kim et al. | 429/482 |
| 2003/0072991 A1 * | 4/2003 | Matsubara et al. | 429/42 |
| 2004/0188248 A1 * | 9/2004 | Sawa | 204/295 |
| 2006/0078775 A1 | 4/2006 | Xie et al. | |
| 2006/0102869 A1 | 5/2006 | Cavaille et al. | |
| 2009/0054552 A1 * | 2/2009 | Yano et al. | 523/200 |
| 2010/0065236 A1 * | 3/2010 | Henriksson et al. | 162/174 |
| 2011/0262731 A1 * | 10/2011 | Mukai et al. | 428/292.1 |

FOREIGN PATENT DOCUMENTS

| | | | |
|---|---|---|---|
| EP | 2293370 A2 | | 3/2011 |
| JP | 2002025583 A | | 1/2002 |
| JP | 2004-063430 A | | 2/2004 |
| JP | 2005285549 A | | 10/2005 |
| JP | 2005530882 A | | 10/2005 |
| JP | 2006185832 A | | 7/2006 |
| JP | 2010211965 A | * | 9/2010 |
| KR | 1020050122451 A | | 12/2005 |
| KR | 1020070006796 A | | 1/2007 |
| WO | 2009/011753 A3 | | 1/2009 |
| WO | 2010131602 A1 | | 11/2010 |
| WO | WO 2011074905 A2 | * | 6/2011 |

OTHER PUBLICATIONS

Y.F. Zhang, S.J. Wang, M. Xiao, S.G. Bian, Y.Z. Meng; "The silica-doped sulfonated poly(fluorenyl ether ketone)s membrane using hydroxypropyl methyl cellulose as dispersant for high temperature proton exchange membrane fuel cells." International Journal of Hydrogen Energy, vol. 34, Issue 10, May 2009, pp. 4379-4386.

* cited by examiner

POLYMER ELECTROLYTE MEMBRANE FOR FUEL CELL, MEMBRANE ELECTRODE ASSEMBLY AND FUEL CELL INCLUDING THE SAME

This application is a National Stage Application of International Patent Application No. PCT/KR2012/004416, filed Jun. 5, 2012, and claims the benefit of Korean Patent Application No. 10-2011-0058603, filed Jun. 16, 2011, in the Korean Intellectual Property Office, the disclosures of which are incorporated herein by reference.

TECHNICAL FIELD

The present invention relates to a polymer electrolyte membrane for fuel cells which has enhanced mechanical properties. More specifically, the present invention relates to a polymer electrolyte membrane for fuel cells which includes fibrous nanoparticles having a hydrophilic group and thus has enhanced mechanical properties, and a membrane electrode assembly and fuel cell including the polymer electrolyte membrane.

BACKGROUND ART

Recently, there has been a growing interest in alternative energy sources as depletion of existing energy resources such as petroleum or coal is expected. As one alternative energy source, in particular, fuel cells are receiving much attention due to high efficiency, no discharge of pollutants such as $NO_x$, $SO_x$, and the like, and abundance of fuels used.

Fuel cells are power generation systems that convert chemical reaction energy of a fuel and an oxidizing agent into electrical energy. Hydrogen, methanol, or a hydrocarbon such as butane or the like is used as the fuel, and oxygen is used as the oxidizing agent.

In polymer electrolyte fuel cells, the most basic unit that generates electricity is a membrane electrolyte assembly (MEA), which includes a polymer electrolyte membrane and an anode and cathode disposed on opposite surfaces of the polymer electrolyte membrane. Referring to FIG. 1 and Reaction Scheme 1 (reaction scheme of a fuel cell using hydrogen as a fuel) that illustrate a principle of electricity generation of fuel cells, oxidation of the fuel occurs at an anode to generate hydrogen ions and electrons, the hydrogen ions move to a cathode via a polymer electrolyte membrane, and oxygen (oxidizing agent), the hydrogen ions transferred via the polymer electrolyte membrane, and the electrons react at the cathode to produce water. Transfer of electrons to an external circuit occurs by such reaction.

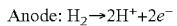

Anode: $H_2 \rightarrow 2H^+ + 2e^-$

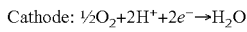

Cathode: $\frac{1}{2}O_2 + 2H^+ + 2e^- \rightarrow H_2O$

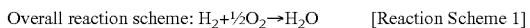

Overall reaction scheme: $H_2 + \frac{1}{2}O_2 \rightarrow H_2O$      [Reaction Scheme 1]

In this reaction, the polymer electrolyte membrane undergoes changes in thickness and volume of 15 to 30% according to temperature and a degree of hydration and, in particular, undergoes changes in volume of up to 200% or greater by 3 to 50 wt % of methanol as a fuel. Accordingly, the polymer electrolyte membrane repeatedly undergoes swelling and contraction according to operating conditions of a fuel cell and, due to such changes in volume, polymer chains of the polymer electrolyte membrane are disentangled and thus the polymer electrolyte membrane has reduced mechanical strength and micropores or cracks are formed therein. Through such micropores or cracks, hydrogen or methanol crossover occurs, which is a main cause of reduction in durability of fuel cells.

For these reasons, fluorine-based cation exchange resins with high conductivity and excellent mechanical/physical properties and chemical resistance are mainly used as the polymer electrolyte membrane. In particular, a perfluorosulfonic acid resin membrane prepared using perfluorosulfonic acid resin (Model name: Nafion) is mainly used.

The perfluorosulfonic acid resin has a tensile strength of 26 to 34 MPa at room temperature in a wet state and a tensile strength of 32 to 43 MPa at 50% relative humidity. The tensile strength of the perfluorosulfonic acid resin has no problem under general operating conditions of a fuel cell, but the perfluorosulfonic acid resin membrane requires superior mechanical properties because fuel cells used in vehicles and the like require smooth operation under more stringent conditions.

In general, to enhance durability of a polymer electrolyte membrane for fuel cells, a method of enhancing strength of an electrolyte membrane resin itself or a method of filling a porous substrate with an electrolyte membrane resin is used. However, when the former method is used, in general, ion exchange capability is reduced and, when the latter method is used, durability improvement effects are obtained while there are many difficulties in manufacturing processes and raw material costs increase. As another method, there is a method of mixing an electrolyte membrane resin and a material for enhancing durability, but the mixing process is not easy and, above all, distinct effects are not obtained.

Therefore, those working in the related field had put much effort into addressing these problems and thus completed the present invention.

DISCLOSURE

Technical Problem

The present invention aims to address the aforementioned problems of the related art and to achieve technical goals that have long been sought.

Thus, an object of the present invention is to provide a polymer electrolyte membrane for fuel cells which includes fibrous nanoparticles having a hydrophilic group and thus having significantly enhanced mechanical properties as compared to existing polymer electrolyte membrane fuel cells.

Another object of the present invention is to provide a membrane electrode assembly including the polymer electrolyte membrane.

Another object of the present invention is to provide a fuel cell including the polymer electrolyte membrane.

Technical Solution

In accordance with one aspect of the present invention, provided is a polymer electrolyte membrane for fuel cells which includes a fluorine-based cation exchange resin having proton conductivity and fibrous nanoparticles having a hydrophilic group.

As described above, when the polymer electrolyte membrane includes the fluorine-based cation exchange resin having proton conductivity and the fibrous nanoparticles having a hydrophilic group, the fibrous nanoparticles having a hydrophilic group work together when the fluorine-based cation exchange resin swells and contracts and thus stress due to changes in volume may be reduced, a degree of contraction due to loss of moisture may be reduced even under low humidity conditions due to presence of the hydrophilic group, and a tensile strength of the polymer electrolyte membrane may be enhanced even when exposed to moisture. In addition, the fibrous nanoparticles have a small particle size and a large surface area, and may be uniformly dispersed in the fluorine-based cation exchange resin having proton conductivity due to its hydrophilic group, which largely contributes to enhancement of mechanical/physical properties of the prepared polymer electrolyte membrane. In addition, manufacturing processes of the polymer electrolyte membrane are much simpler than when a porous material or the like is used. Thus, when a fuel cell is manufactured using the above-described polymer electrolyte membrane, a fuel cell with high durability for extended use may be obtained.

In the polymer electrolyte membrane for fuel cells, the fluorine-based cation exchange resin having proton conductivity and the fibrous nanoparticles having a hydrophilic group may be mixed in a weight ratio of 99.9:0.1 to 95:5.

When the amount of the fibrous nanoparticles having a hydrophilic group is too small, it is difficult to achieve desired enhancement of mechanical properties. On the other hand, when the amount of the fibrous nanoparticles having a hydrophilic group is too much, the fibrous nanoparticles partially agglomerate and thus a path for crossover of a fuel may be formed. For this reason, the amount of the fibrous nanoparticles having a hydrophilic group may be between 0.1 and 3 wt % based on a total amount of the polymer electrolyte membrane.

The fibrous nanoparticles having a hydrophilic group may be prepared by decomposing a material used as a raw material of the fibrous nanoparticles using a microfluidizer, but preparation methods thereof are not limited thereto.

A microfluidizer is designed such that a flow channel of a microtube is divided into two and then combined into one. When a dispersion of a material to be decomposed is injected into the microfluidizer, the dispersion flows after being divided due to the two flow channels, and the divided dispersions collide with each other at a location where the two flow channels are combined into one, being decomposed into microparticles. The dispersion flows at a high rate of hundreds of meters per second by high pressure, and the flow rate determines force of decomposition of the material.

In one embodiment, the fibrous nanoparticles having a hydrophilic group may have a diameter of 1 to 200 nm, for example, a diameter of 10 to 200 nm and may have a length of 1 to 20 μm.

Since the fibrous nanoparticles having a hydrophilic group have a nano-scale particle size, the fibrous nanoparticles may be more uniformly dispersed in the cation exchange resin and enhance durability even when used in a small amount.

However, when the diameter of the fibrous nanoparticles having a hydrophilic group is too small, it is difficult to contribute to enhancement of mechanical strength. On the other hand, when the diameter of the fibrous nanoparticles having a hydrophilic group is too large, it may be difficult to anticipate bonding strength enhancing effects due to increase in surface area, which are properties of fibrous nanoparticles. In addition, when the length of the fibrous nanoparticles having a hydrophilic group is too short, it is difficult for the fibrous nanoparticles to exist as a fibrous form. On the other hand, when the length of the fibrous nanoparticles having a hydrophilic group is too long, dispersibility thereof in the cation exchange resin may be reduced.

In another embodiment, the fibrous nanoparticles having a hydrophilic group may have an aspect ratio of 1:5 to 1:2,000.

When the aspect ratio of the fibrous nanoparticles having a hydrophilic group is too small, it is difficult for the fibrous nanoparticles to exist as a fibrous form and, accordingly, enhancement of mechanical strength is not achieved. On the other hand, when the aspect ratio of the fibrous nanoparticles having a hydrophilic group exceeds the above-described range, dispersibility thereof is reduced and thus the fibrous nanoparticles partially agglomerate with each other in the cation exchange resin, which serves as a passage of a fuel or the like.

The fibrous nanoparticles having a hydrophilic group are not particularly limited so long as the fibrous nanoparticles have the above-described properties. For example, cellulose-based nanofibers may be used.

Cellulose-based nanofibers consist of crystalline and amorphous regions. The crystalline region thereof enhances elasticity and tensile strength of a substance and the amorphous region expands by absorbing water or enhances flexibility of a substance. The cellulose-based nanofibers have a hydroxyl group (—OH) as a hydrophilic group.

In one embodiment, the hydroxyl group of the cellulose-based nanofibers may be present in an amount of 5 to 90% based on a total amount of hydroxyl group sites.

When the content of the hydroxyl group is too small, the cellulose-based nanofibers have a low degree of swelling by absorbing water and thus have a reduced binding strength with the cation exchange resin, which eventually does not contribute to enhancement of mechanical strength of the polymer electrolyte membrane for fuel cells. On the other hand, when the content of the hydroxyl group is too much, the cellulose-based nanofibers have reduced miscibility with a solvent and thus it is difficult to prepare the polymer electrolyte membrane for fuel cells.

In a specific embodiment, the content of the hydroxyl group in the cellulose-based nanofibers may be between 10 and 80%, for example, between 20 and 70%.

The cellulose-based nanofibers may be largely classified into cellulose nanofibers, hydroxyl groups of which are unsubstituted, and cellulose nanofibers, hydroxyl groups of which are partially substituted, such as cellulose ester nanofibers, cellulose ether nanofibers, and the like. These cellulose-based nanofibers may be used alone or in combination of at least two thereof. Specific examples thereof include, without being limited to, at least one selected from the group consisting of cellulose nanofibers, hydroxyl groups of which are unsubstituted; cellulose nanofibers substituted with an acetyl group or a derivative thereof; cellulose sulfate nanofibers; cellulose phosphate nanofibers; and cellulose nanofibers substituted with a $C_1$-$C_{10}$ alkyl group or a derivative thereof such as methyl cellulose nanofibers, ethyl cellulose nanofibers, carboxymethyl cellulose nanofibers and hydroxyethyl cellulose nanofibers, in particular cellulose nanofibers substituted with a $C_2$-$C_6$ alkyl group or a derivative thereof. Of these, more particularly, cellulose nanofibers substituted with a $C_2$-$C_{10}$ alkyl group or a derivative thereof, and cellulose nanofibers substituted with an acetyl group or a derivative thereof may be used in terms of low solubility.

For example, the cellulose may have a molecular weight of 30,000 to 3,000,000 and the molecular weight may also be beyond the above-described ranges in consideration of various factors such as aspect ratio of fibrous nanoparticles, the type of substituent, and substitution degree.

In the present invention, the fluorine-based cation exchange resin may consist of a continuous chain of molecules formed by covalent bonding of atoms as a main chain and a side chain branched from the main chain.

Thus, the fluorine-based cation exchange resin having proton conductivity may be a polymer that is provided at a side chain thereof with one or more cation exchange groups selected from the group consisting of a sulfonic acid group, a carboxylic acid group, a phosphoric acid group, a phosphonic acid group, and derivatives thereof.

In one embodiment, the fluorine-based cation exchange resin having proton conductivity may be a perfluorosulfonic acid resin.

In addition, the fluorine-based cation exchange resin having proton conductivity may include a fluorine-based one in an amount of 30 to 99 wt %, for example, in an amount of 50 to 80 wt %, based on a total weight of the fluorine-based cation exchange resin having proton conductivity.

In some embodiments, the polymer electrolyte membrane for fuel cells according to the present invention may further include at least two cation exchange resin membranes having proton conductivity that are stacked opposite to each other with the polymer electrolyte membrane disposed therebetween. To fabricate the stacked structure, the opposing membranes may be coated on opposite sides of the polymer electrolyte membrane and thermally compressed, but embodiments of the present invention are not limited thereto. That is, known methods of stacking membranes may be used.

The present invention also provides a membrane electrode assembly for fuel cells in which the polymer electrolyte membrane for fuel cells is interposed between an anode and a cathode that face each other.

The membrane electrode assembly for fuel cells has high durability because mechanical strength of the polymer electrolyte membrane is significantly enhanced when a fuel cell including the membrane electrode assembly is operated.

The present invention also provides a fuel cell including:
at least one electricity generator including the membrane electrode assembly for fuel cells and at least one separator and
generating electricity through electrochemical reaction of a fuel and an oxidizing agent;
a fuel feeder to feed the fuel to the electricity generator; and
an oxidizing agent feeder to feed the oxidizing agent to the electricity generator.

The membrane electrode assembly manufactured using the polymer electrolyte membrane, and structure and manufacturing method of the fuel cell are known in the art and a detailed description thereof will thus be omitted here.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, the present invention will be described in more detail with reference to the accompanying drawings and the following examples. These examples are only provided for illustration of the present invention and should not be construed as limiting the scope and spirit of the present invention.

Figure 1:
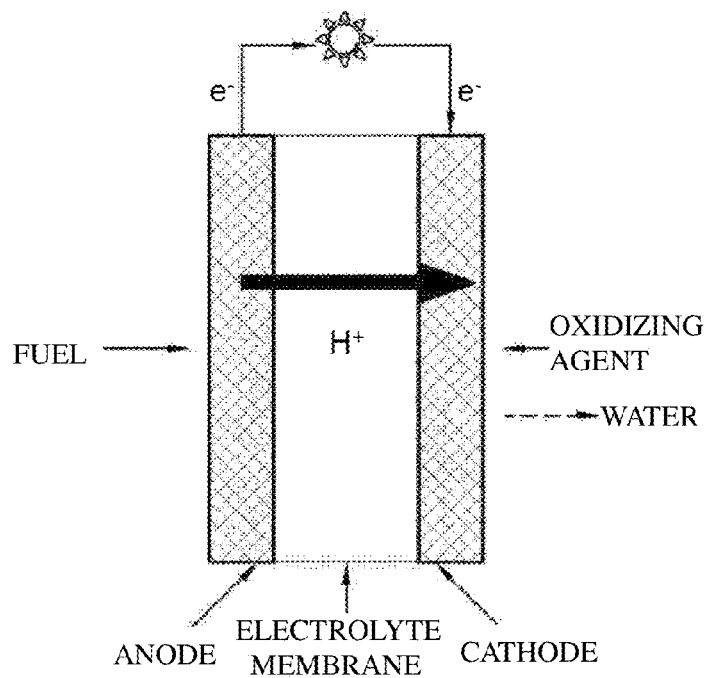
FIG. 1 is a view explaining a principle of electricity generation of a fuel cell.
Figure 2:
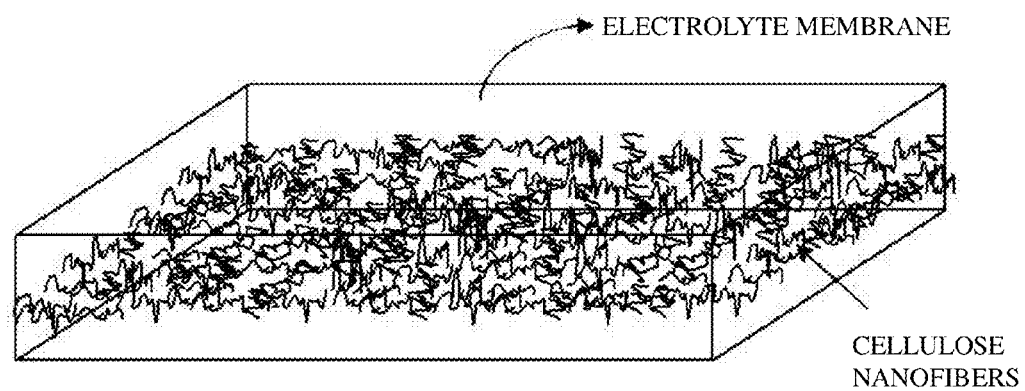
FIG. 2 is a schematic view of a polymer electrolyte membrane for fuel cells according to an embodiment of the present invention.
Figure 3:
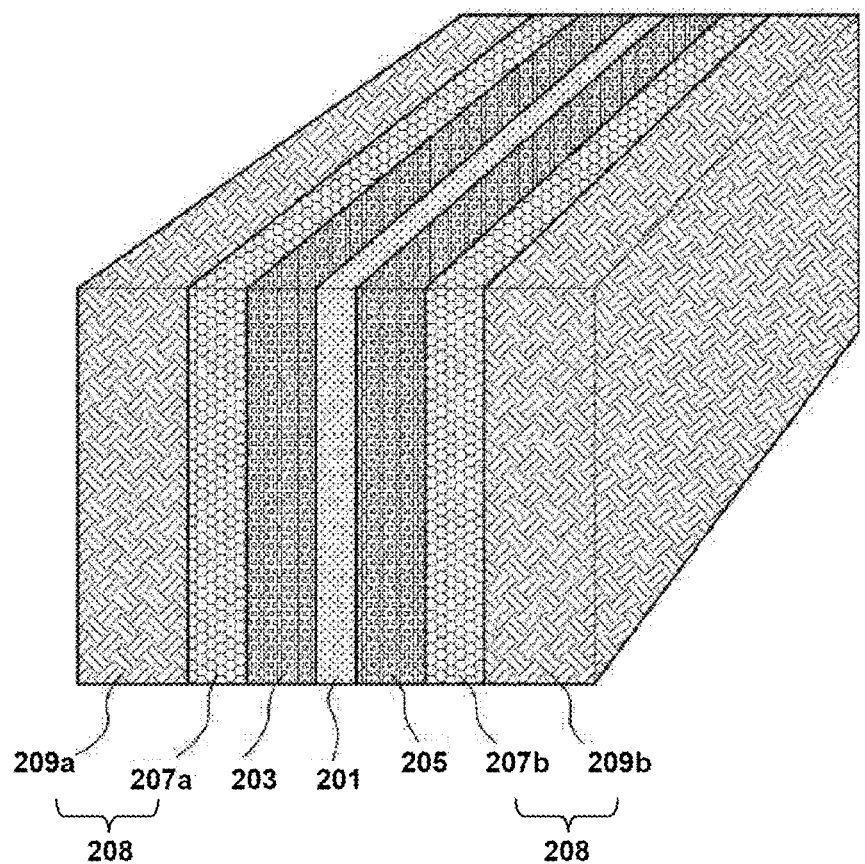
FIG. 3 is a schematic view illustrating a structure of a membrane electrode assembly for fuel cells according to an embodiment of the present invention.

FIG. 2 is a schematic view of a polymer electrolyte membrane for fuel cells according to an embodiment of the present invention. FIG. 3 is a schematic view illustrating a structure of a membrane electrode assembly for fuel cells according to an embodiment of the present invention.

Referring to FIGS. 2 and 3, the polymer electrolyte membrane 201 for fuel cells according to the present invention includes cellulose nanofibers.

In addition, the membrane electrode assembly for fuel cells according to the present invention may include an anode 203, a cathode 205 facing the anode 203, and the polymer electrolyte membrane 201 disposed between the anode 203 and the cathode 205. The anode 203 and the cathode 205 may further include a gas diffusion layer 208, and the gas diffusion layer 208 of the anode 203 may include a base 209a and a microporous layer 207a formed on a surface of the base 209a and the gas diffusion layer 208 of the cathode 205 may include a base 209b and a microporous layer 207b formed on a surface of the base 209b.

Figure 4:
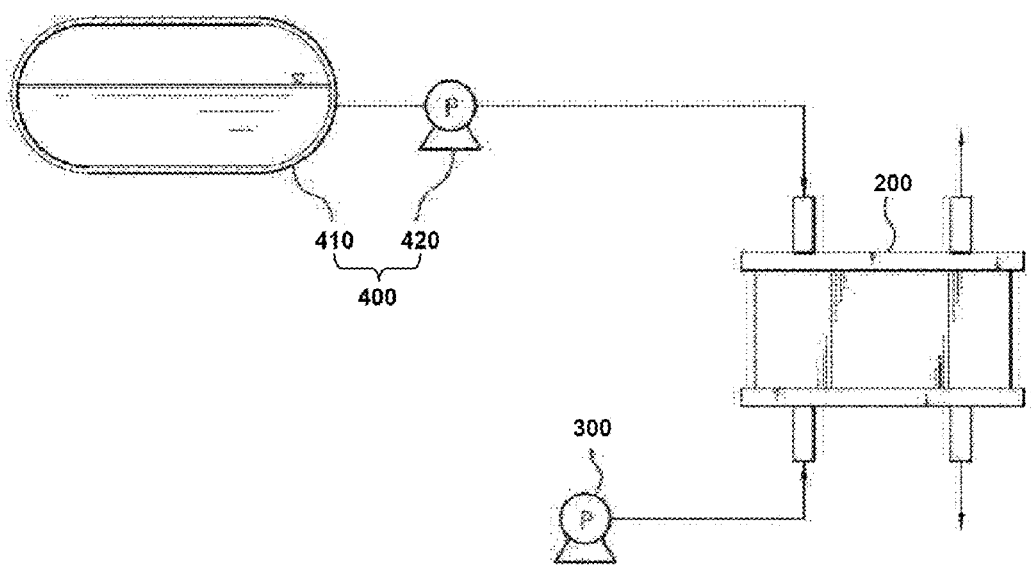
FIG. 4 is a schematic view illustrating a structure of a fuel cell according to an embodiment of the present invention.

FIG. 4 is a schematic view illustrating a structure of a fuel cell according to an embodiment of the present invention.

Referring to FIG. 4, the fuel cell includes an electricity generator 200, a fuel feeder 400, and an oxidizing agent feeder 300. The fuel cell includes at least one electricity generator 200 that includes at least one membrane electrode assembly including an anode, a cathode facing the anode, and the polymer electrolyte membrane for fuel cells according to the present invention disposed therebetween and generating electricity through electrochemical reaction of a fuel and an oxidizing agent and at least one separator; a fuel feeder 400 to feed the fuel to the electricity generator 200; and an oxidizing agent feeder 300 to feed the oxidizing agent to the electricity generator 200.

The electricity generator 200 includes at least one membrane electrode assembly according to the present invention. When at least two membrane electrode assemblies are included, a separator may be interposed therebetween. The separator prevents membrane electrode assemblies from being electrically connected and transfers fuels and oxidizing agents supplied from the outside to the membrane electrode assemblies.

The fuel feeder 400 feeds a fuel to the electricity generator 200 and includes a fuel tank 410 to store a fuel and a pump 420 to supply the fuel stored in the fuel tank 410 to the electricity generator 200. The fuel may be hydrogen or hydrocarbon fuel in a gas or liquid state and examples of the hydrocarbon fuel include methanol, ethanol, propanol, butanol, and natural gases.

The oxidizing agent feeder 300 feeds the oxidizing agent to the electricity generator 200. As a representative example of the oxidizing agent, oxygen may be used and oxygen or air may be used through injecting into the pump 300.

Now, the present invention will be described in more detail with reference to the following examples. These examples are provided only for illustration of the present invention and should not be construed as limiting the scope and spirit of the present invention.

Example 1

Figure 5A:
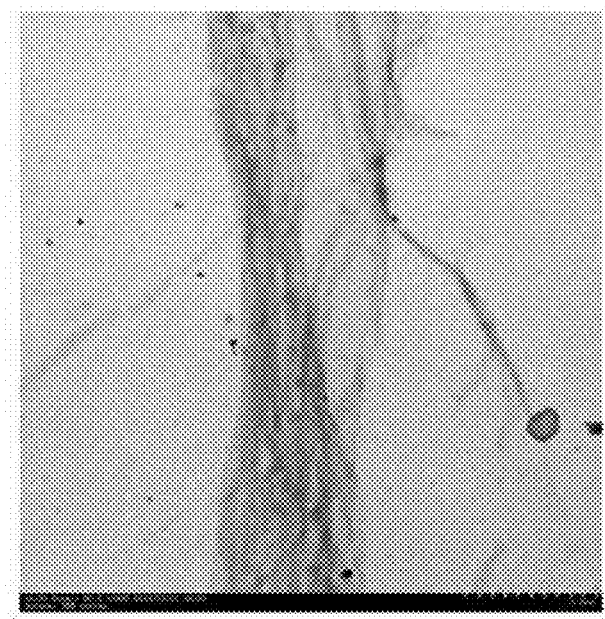
FIGS. 5A and 5B are transmission electron microscope (TEM) images respectively showing shapes of cellulose before and after being subjected to treatment with a microfluidizer.
Figure 5B:
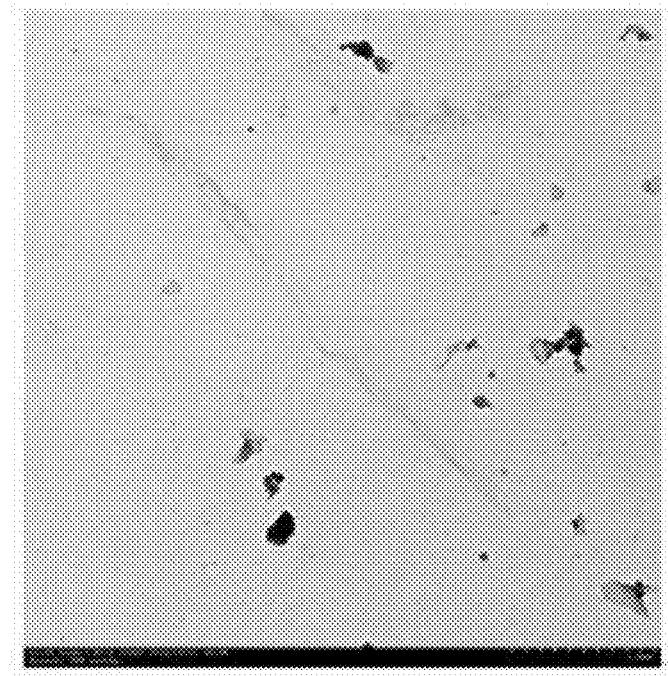

An ethyl cellulose powder (Dow Inc., ETHOCEL™, substituted with 48-49.5% of ethyl group) was dispersed in DMSO and cellulose was decomposed through treatment several times in a solution state using a microfluidizer to prepare nanofibers. The ethyl cellulose nanofibers had a diameter of 10 to 100 nm and a length of 1 to 10 µm. In this regard, shapes of ethyl cellulose before and after treatment using the microfluidizer are illustrated in FIG. 5A and FIG. 5B, respectively.

The prepared cellulose nanofibers and a fluorine-based polymer solution (in this experiment, Nafion dispersion DE2029 was used) were added to DMSO as a solvent and uniformly dissolved therein. The cellulose nanofibers and a fluorine-based polymer were mixed in a weight ratio of 1:99. The mixed solution was coated on a substrate using a film applicator by solution casting to form a membrane having a thickness of 20 µm, the temperature was slowly raised to 80° C., and the membrane was dried for about 24 hours and further dried at 120° C. for 24 hours and subjected to proton exchange by treatment with sulfuric acid, thereby completing fabrication of a polymer electrolyte membrane.

A platinum-supported carbon catalyst and a Nafion ionomer were dissolved in a mixed solvent of water and isopropyl alcohol, and the resulting solution was coated on a carbon paper to prepare two sheets of electrode diffusion layers containing 0.4 mg/cm$^2$ of platinum. The polymer electrolyte membrane was inserted into the two sheets of electrode diffusion layers, followed by hot-pressing at 140° C. for 5 minutes to manufacture an electrode membrane assembly and a fuel cell having a structure as illustrated in FIG. 4 was manufactured.

Example 2

A polymer electrolyte membrane, a membrane electrode assembly, and a fuel cell were manufactured in the same manner as in Example 1, except that the weight ratio of cellulose nanofibers to fluorine-based polymer was 3:97.

Example 3

A polymer electrolyte membrane, a membrane electrode assembly, and a fuel cell were manufactured in the same manner as in Example 1, except that cellulose acetate (manufactured by Aldrich, substituted with about 40% of an acetyl group) was used instead of ethyl cellulose as a material for forming the cellulose nanofibers.

Example 4

A polymer electrolyte membrane, a membrane electrode assembly, and a fuel cell were manufactured in the same manner as in Example 1, except that hydroxy ethyl cellulose (manufactured by Aldrich, substituted with about 42% of a hydroxy ethyl group) was used instead of ethyl cellulose as a material for forming the cellulose nanofibers.

Comparative Example 1

A polymer electrolyte membrane, a membrane electrode assembly, and a fuel cell were manufactured in the same manner as in Example 1, except that the cellulose nanofibers were not used.

Comparative Example 2

A polymer electrolyte membrane, a membrane electrode assembly, and a fuel cell were manufactured in the same manner as in Example 1, except that ethyl cellulose prior to treatment with a microfluidizer was used instead of the cellulose nanofibers.

Experimental Example 1

Figure 6:
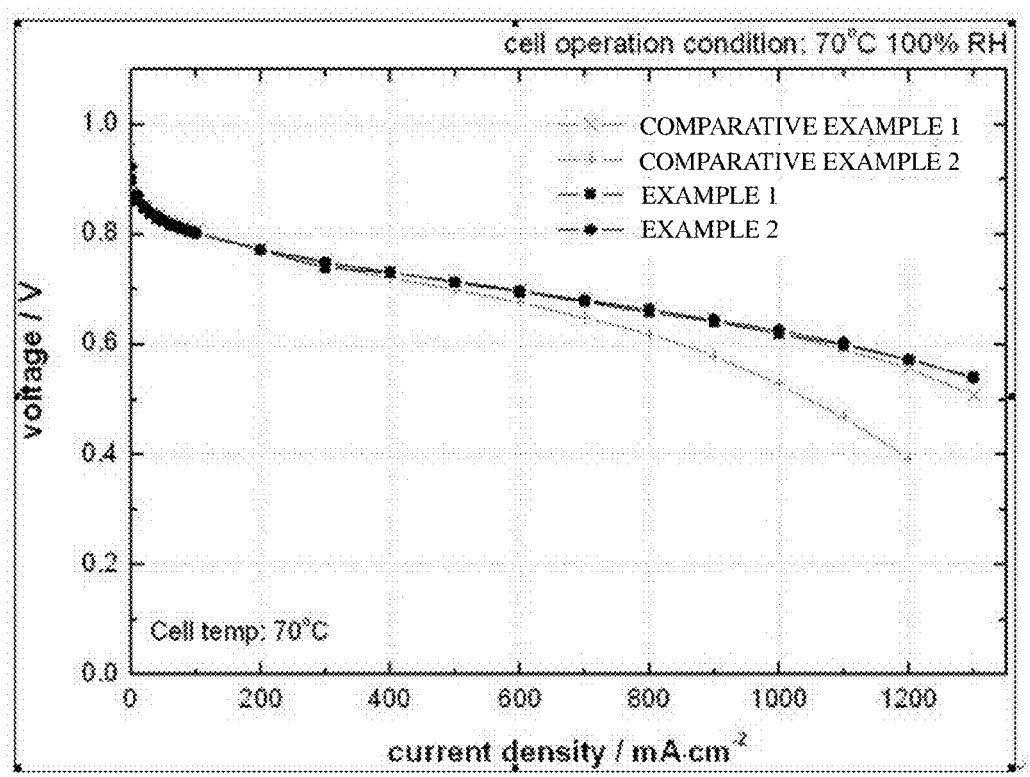
FIGS. 6 and 7 are graphs showing experimental results of performance under 100% RH of membrane electrode assemblies including polymer electrolyte membranes for fuel cells according to examples and comparative examples.
Figure 7:
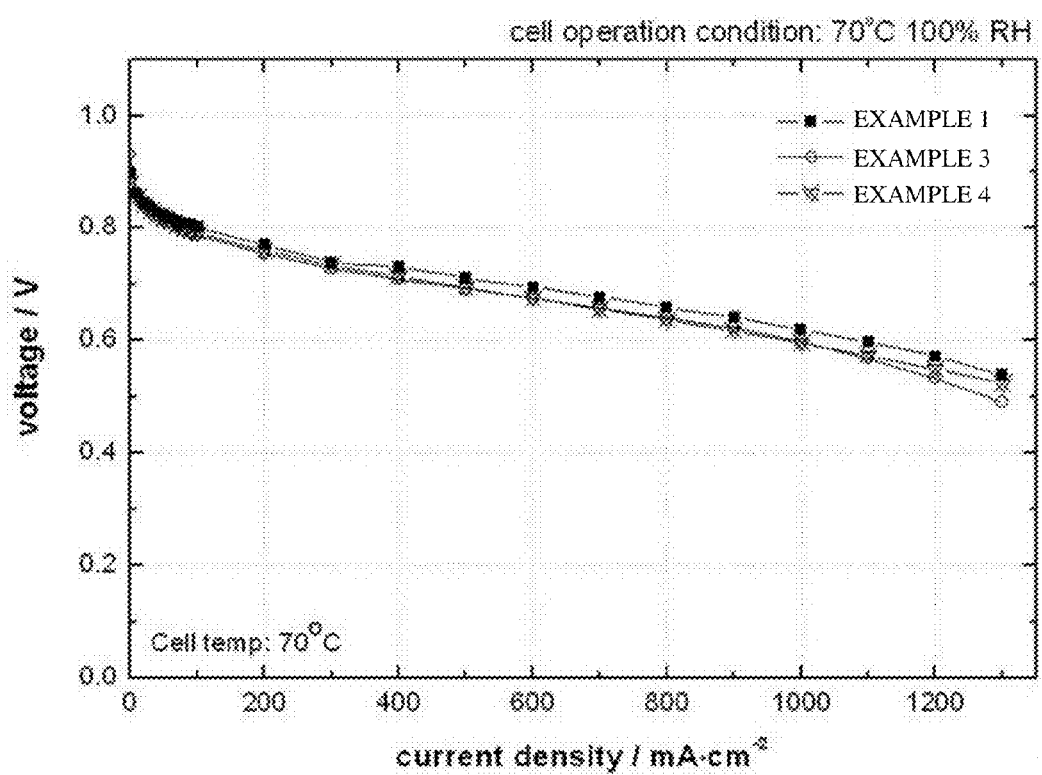

Cell performance of each of the fuel cells manufactured according to Examples 1 to 4 and Comparative Examples 1 and 2 was measured under 100% RH and measurement results are illustrated in FIGS. 6 and 7. In this regard, measurement was performed at a temperature of 70° C.

Referring to FIG. 6, it can be confirmed that the fuel cells of Examples 1 and 2 manufactured using the polymer electrolyte membranes under 100% RH exhibited similar performance to that of the fuel cell of Comparative Example 1 manufactured using the polymer electrolyte membrane without using the cellulose nanofibers.

However, the fuel cell of Comparative Example 2 using the same amount of ethyl cellulose prior to treatment with a microfluidizer as that used in Example 1 exhibited lower performance than that of the fuel cell of Example 1. This is because, as illustrated in FIG. 5A, cellulose prior to treatment with a microfluidizer exists in the form of bundles, i.e., microfibrils, having a diameter of several micrometers or greater and thus a passage for transfer of cations in an electrolyte membrane having a thickness of about 20 µm is blocked.

From the above-described results, it can be confirmed that, when cellulose having a hydrophilic group, in the form of nanofibers, is used, reduction in conductivity of cations of an electrolyte membrane, which may generally occurs when additives are introduced, is not caused, and this is also applied to Examples 3 and 4 using the same amount of nanofibers prepared using cellulose acetate and hydroxy ethyl cellulose as that used in Example 1, as shown in FIG. 7.

Experimental Example 2

A humidification/dehumidification cycle test was performed by applying each of the membrane electrode assemblies manufactured according to Examples 1 to 4 and Comparative Examples 1 and 2 to a general unit battery and alternately supplying RH 150% nitrogen and RH 0% nitrogen to gas inlets at opposite sides of each unit battery every two minutes at 80° C. During the test, hydrogen ($H_2$) crossover was periodically measured and, when hydrogen ($H_2$) crossover rapidly increased, the test was stopped. Test results are illustrated in FIGS. 8 and 9.

Figure 8:
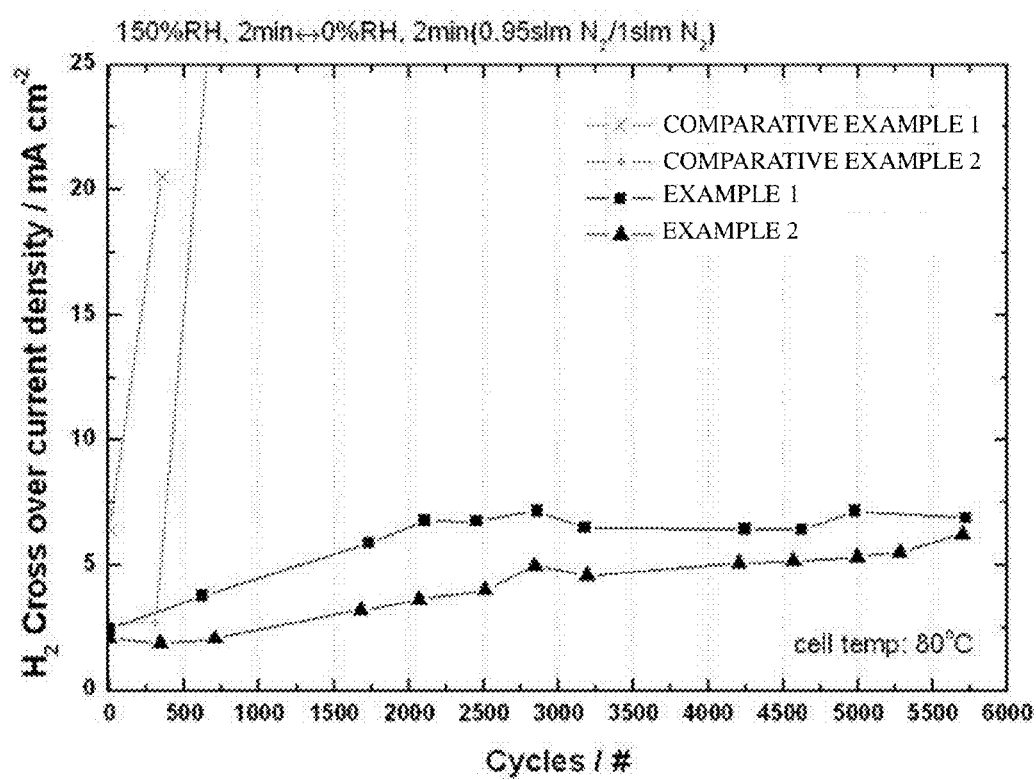
FIGS. 8 and 9 are graphs showing humidification/dehumidification cycle experimental results of membrane electrode assemblies including polymer electrolyte membranes for fuel cells according to examples and comparative examples.
Figure 9:
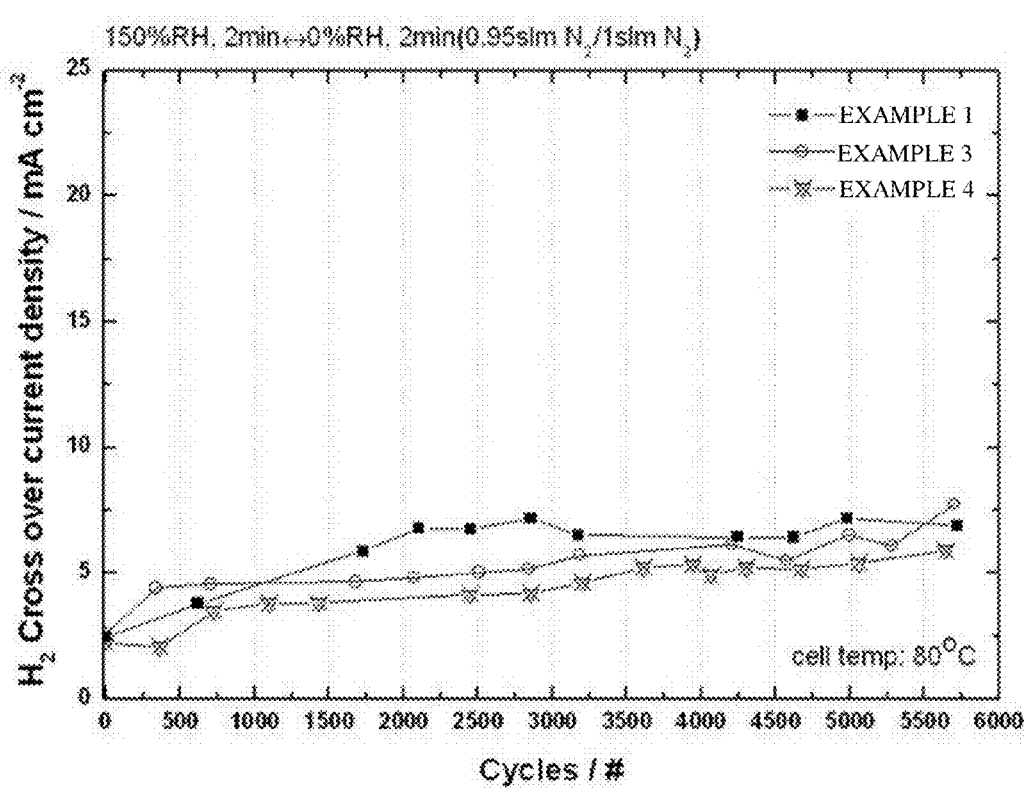

Referring to FIG. 8, it can be confirmed that the membrane electrode assembly of Comparative Example 1 underwent a rapid increase in hydrogen ($H_2$) crossover within several hundreds of cycles after the initial cycle. This is because micropores and cracks are formed in the polymer electrolyte membrane due to repeated swelling and contraction and thus a path of hydrogen ($H_2$) is formed. By contrast, the membrane electrode assemblies of Examples 1 and 2 did not undergo a rapid increase in hydrogen ($H_2$) crossover and the hydrogen ($H_2$) crossover thereof was maintained constant during up to 5,500 cycles.

However, the membrane electrode assembly of Comparative Example 2 using the same amount of ethyl cellulose prior to treatment with a microfluidizer as that used in Example 1 did not exhibit an improvement in durability. This is considered because cellulose exists in an agglomerated form, i.e., microfibrils having a diameter of several micrometers or greater.

The above-described results show that, when cellulose nanofibers are uniformly dispersed in a fluorine-based electrolyte membrane, mechanical properties of the polymer electrolyte membrane according to the present invention may be significantly enhanced. This is also applied to Examples 3 and 4 employing the same amount of nanofibers prepared using cellulose acetate and hydroxy ethyl cellulose as that used in Example 1.

INDUSTRIAL APPLICABILITY

As described above, a polymer electrolyte membrane for fuel cells according to the present invention is based on a fluorine-based cation exchange resin and thus performance of a fuel cell including the polymer electrolyte membrane may not be deteriorated and the polymer electrolyte membrane may prevent gases from permeating thereinto, and may have significantly enhanced durability for extended use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polymer electrolyte membrane for fuel cells, comprising a fluorine-based cation exchange resin having proton conductivity and fibrous nanoparticles having a hydrophilic group,
wherein the fibrous nanoparticles have a hydrophilic group, have a diameter of 10 to 200 nm and a length of 1 to 20 μm, and have an aspect ratio of 1:5 to 1:2,000, and
wherein the fibrous nanoparticles having the hydrophilic group are cellulose-based nanofibers.

2. The polymer electrolyte membrane according to claim 1, wherein the fluorine-based cation exchange resin having proton conductivity and the fibrous nanoparticles having a hydrophilic group are mixed in a weight ratio of 99.9:0.1 to 95:5.

3. The polymer electrolyte membrane according to claim 1, wherein the fibrous nanoparticles having a hydrophilic group are prepared using a microfluidizer.

4. The polymer electrolyte membrane according to claim 1, wherein a hydroxyl group of the cellulose-based nanofibers is present in an amount of 5 to 90% with respect to a total site of the hydroxyl group.

5. The polymer electrolyte membrane according to claim 1, wherein the cellulose-based nanofibers are at least one selected from the group consisting of cellulose nanofibers, hydroxyl groups of which are unsubstituted, cellulose nanofibers substituted with an acetyl group or a derivative thereof, cellulose sulfate nanofibers, cellulose phosphate nanofibers, and cellulose nanofibers substituted with a C1-C10 alkyl group or a derivative thereof.

6. The polymer electrolyte membrane according to claim 5, wherein the cellulose-based nanofibers are at least one selected from the group consisting of cellulose nanofibers, hydroxyl groups of which are unsubstituted, cellulose nanofibers substituted with an acetyl group or a derivative thereof, cellulose sulfate nanofibers, cellulose phosphate nanofibers, and cellulose nanofibers substituted with a C2-C6 alkyl group or a derivative thereof.

7. The polymer electrolyte membrane according to claim 1, wherein the fluorine-based cation exchange resin having proton conductivity is a polymer having, at a side chain thereof, at least one cation exchange group selected from the group consisting of a sulfonic acid group, a carboxylic acid group, a phosphoric acid group, a phosphonic acid group, and derivatives thereof.

8. The polymer electrolyte membrane according to claim 1, wherein the fluorine-based cation exchange resin having proton conductivity is a perfluorosulfonic acid resin.

9. The polymer electrolyte membrane according to claim 1, wherein the fluorine-based cation exchange resin having proton conductivity is included in an amount of 30 to 99 wt % based on a total weight of the cation exchange resin having proton conductivity.

10. A membrane electrode assembly for fuel cells, comprising an anode, a cathode facing the anode, and the polymer electrolyte membrane according to claim 1 disposed therebetween.

11. A fuel cell comprising:
at least one electricity generator comprising the membrane electrode assembly according to claim 10 and at least one separator and generating electricity through electrochemical reaction of a fuel and an oxidizing agent;
a fuel feeder to feed the fuel to the electricity generator; and
an oxidizing agent feeder to feed the oxidizing agent to the electricity generator.

* * * * *